(12) United States Patent
Yasuda

(10) Patent No.: US 6,433,295 B1
(45) Date of Patent: Aug. 13, 2002

(54) SURFACE ROUGHNESS DEPENDENT METHODS OF ELECTRIC DISCHARGE MACHINING AND DEVICE THEREOF

(75) Inventor: Osamu Yasuda, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 13 days.

(21) Appl. No.: 09/714,506

(22) Filed: Nov. 17, 2000

Related U.S. Application Data

(63) Continuation of application No. PCT/JP99/01332, filed on Mar. 18, 1999.

(51) Int. Cl.[7] .......................... B23H 1/00; B23H 11/00; B23H 1/10
(52) U.S. Cl. ............................... 219/69.11; 219/69.12; 219/69.17
(58) Field of Search ........................... 219/69.12, 69.14, 219/69.11, 69.17, 69.13

(56) References Cited

U.S. PATENT DOCUMENTS

| | | | | |
|---|---|---|---|---|
| 5,315,088 A | * | 5/1994 | Yamada et al. | 219/69.2 |
| 5,408,063 A | * | 4/1995 | Onishi | 219/69.14 |
| 5,428,199 A | * | 6/1995 | Berger et al. | 219/69.11 |
| 5,854,459 A | * | 12/1998 | Buhler et al. | 219/69.12 |

FOREIGN PATENT DOCUMENTS

| | | |
|---|---|---|
| JP | 61-230820 | 10/1986 |
| JP | 63-722 | 1/1988 |
| JP | 2-250719 | 10/1990 |
| JP | 4-201119 A * | 7/1992 |
| JP | 7-1249 | 1/1995 |

OTHER PUBLICATIONS

International Search Report
Abstract 63–000722 Jan. 5, 1988.
Abstract 2–250719 Oct. 18, 1990.

* cited by examiner

Primary Examiner—Geoffrey S. Evans
(74) Attorney, Agent, or Firm—Sughrue Mion, PLLC

(57) ABSTRACT

When the surface roughness of a work face of the workpiece (2) fixed onto the surface plate table (8) in the work tank (14) in which the work fluid (17) is stored is more than a predetermined value, the bladder (15) capable of expanding or contracting by the pressure of fluid accommodated in the bladder (15) is contracted, and a space between the work tank (14) and the surface plate table (8) is filled with the work fluid (17), and electric discharge work is conducted. When the surface roughness of a work face of the workpiece (2) is not more than a predetermined value, the bladder (15) is expanded, and a quantity of the work fluid (17) getting into between the work tank (14) and the surface plate table (8) is reduced and electric discharge work is conducted.

8 Claims, 8 Drawing Sheets

SECTION X-X

FIG.3

|  | WORK IN WHICH SURFACE ROUGHNESS OF WORK FACE IS MORE THAN 3 $\mu$mRMAX | WORK IN WHICH SURFACE ROUGHNESS OF WORK FACE IS NOT MORE THAN 3 $\mu$mRMAX |
|---|---|---|
| FEEDER CABLE | ON | OFF |
| FINISH FEEDER CABLE | ON | OFF |
| BLADDER | STATE OF CONTRACTION | STATE OF EXPANSION |

SECTION Y-Y

FIG.6

|  | WORK IN WHICH SURFACE ROUGHNESS OF WORK FACE IS MORE THAN 3 μmRMAX | WORK IN WHICH SURFACE ROUGHNESS OF WORK FACE IS NOT MORE THAN 3 μmRMAX |
|---|---|---|
| FEEDER CABLE | ON | OFF |
| FINISH FEEDER CABLE | ON | ON |
| SPACE A | FILLED WITH SUBSTANCE OF HIGH DIELECTRIC CONSTANT | FILLED WITH SUBSTANCE OF LOW DIELECTRIC CONSTANT |

_US 6,433,295 B1_

SURFACE ROUGHNESS DEPENDENT METHODS OF ELECTRIC DISCHARGE MACHINING AND DEVICE THEREOF

This application is a continuation of PCT/JP99/01332, filed Mar. 18, 1999.

BACKGROUND OF THE INVENTION

The present invention relates to improvements in a method of electric discharge machining and device thereof for conducting electric discharge machining on a workpiece by supplying electric power between an electrode and the workpiece.

FIG. 7 is a view showing an overall arrangement of a wire electric discharge machine which is an example of the conventional electric discharge device. In the drawing, reference numeral 2 is a workpiece, reference numeral 3 is a lower nozzle for spraying work fluid during working, reference numeral 4 is an NC device, reference numeral 5 is an upper nozzle for spraying work fluid during working, reference numeral 6 is a wire electrode for working, reference numeral 7 is a tapering device, in which U-axis drive unit and V-axis drive unit are housed, for moving the upper nozzle 5 with respect to the lower nozzle 3 in the case of tapering, reference numeral 8 is a surface plate table on which the workpiece 2 is set, reference numeral 9 is a power source for supplying electric power for working to the workpiece 2 and the wire electrode 6, reference numeral 21 is a wire bobbin round which the wire electrode 6 is wound, reference numeral 22 is a pulley for changing a direction of the wire electrode 6, reference numeral 23 is a tensioner for giving a constant intensity of tension to the wire electrode 6, reference numeral 24 is a wire recovery roller for feeding the wire electrode 6, reference numeral 27 is an X-axis servo motor for moving the surface plate table 8 in the direction of X-axis, reference numeral 28 is a Y-axis servo motor for moving the surface plate table 8 in the direction of Y-axis, reference numeral 29 is a servo motor of Z-axis for moving the tapering device 7 and the upper nozzle 5 in the direction of Z-axis, reference numeral 30 is a servo motor of U-axis for moving the tapering device 7 in the direction of U-axis, and reference numeral 31 is a servo motor of V-axis for moving the tapering device 7 in the direction of V-axis. In this case, electric power supply to the workpiece 2 and the wire electrode 6 is omitted here.

FIGS. 8a and 8b are arrangement views of a surface plate table of a conventional wire electric discharge machine for obtaining smoother surface roughness on a work surface. In the drawing, reference numeral 1 is an insulating member, reference numeral 2 is a workpiece, reference numeral 3 is a lower nozzle for spraying work fluid in the process of working, reference numeral 5 is an upper nozzle for spraying work fluid in the process of working, reference numeral 10 is a feeder cable, reference numeral 11 is a finish feeder cable, reference numeral 12 is a contactor for opening and closing the feeder cable 10 and the finish feeder cable 11, reference numeral 13 is an auxiliary contactor for opening and closing electric power supply from the feeder cable 10 to the workpiece 2, and reference numeral 14 is a work tank for storing work fluid so that the workpiece 2, lower nozzle 3 and upper nozzle 5 can be dipped in the work fluid.

In FIGS 8a and 8b, electric power supply to the wire electrode is not shown, for clarity.

Next, a method of electric power supply will be explained below. For example, when working is conducted under the condition that the surface roughness of a work surface is more than 3 μmRmax, both the feeder cable 10 and the finish feeder cable 11 are used for working, and when working is conducted under the condition that the surface roughness of a work surface is not more than 3 μmRmax, which is smoother than the above surface roughness, only the finish feeder cable 11 is used for working so that an intensity of electric discharge energy can be reduced to conduct working with high accuracy. The above is an example in which material of the workpiece 2 is SKD11, thickness of the workpiece is 20 mm, material of the wire electrode 6 is brass and diameter of the wire electrode 6 is 0.2 mm. In the case where material of the workpiece 2 is changed or thickness of the workpiece 2 is changed, and in the case where material of the wire electrode 6 is changed or diameter of the wire electrode 6 is changed, surface roughness of the work face, by which an intensity of electric power to be supplied is changed, is changed. In the above example, surface roughness 3 μmRmax is changed.

A case in which surface roughness of the work face, by which an intensity of electric power to be supplied is changed, is 3 μmRmax will be explained as follows.

In the structure shown in FIG. 8(a), the insulating member 1 is arranged in an upper portion of the surface plate table 8, and the workpiece 2 is set in an upper portion of the insulating member 1. The frequency of working determined by the required surface roughness of a product is inputted into the working program, and the energy setting of the working electric power source 9 with respect to the frequency of working is also inputted into the working program, and then the program is carried out.

In the case of working in which surface roughness of the work face is not more than 3 μmRmax, electric power supply from the feeder cable 10 is stopped by the contactor 12, and electric power is supplied only by the finish feeder cable 11. When the auxiliary contactor 13 is opened at the same time, the workpiece 2 is insulated except for the supply of electric power by the finish feeder cable 11. Therefore, no electric current is supplied to the workpiece 2 except for the electric current supplied by the finish feeder cable 11. Therefore, it becomes possible to conduct working of smoother surface roughness.

However, the structure shown in FIG. 8(a) has the following disadvantages. The insulating member 1 is arranged in an upper portion of the surface plane table 8. Therefore, it is necessary to attach the insulating member 1 onto the surface plane table 8 at a site where working is actually conducted. Further, it is also necessary to fix the workpiece 2 to the insulating member 1. For the above reasons, compared with a case in which the workpiece 2 is directly attached onto the surface plane table 8, it takes much longer time for preparation. As a result, the manufacturing cost of the parts manufactured by electric discharge might be increased.

In the structure shown in FIG. 8(b), the workpiece 2 is directly arranged in an upper portion of the surface plane table 8. According to the structure shown in FIG. 8(b), the frequency of working determined by the required surface roughness of a product is inputted into the working program, and the energy setting of the working electric power source 9 with respect to the frequency of working is also inputted into the working program, and then the program is carried out. In the case of working in which surface roughness of the work face is not more than 3 μmRmax, electric power supply from the feeder cable 10 is stopped by the contactor 12, so that electric power is supplied only by the finish feeder cable 11. Therefore, no electric current is supplied to the workpiece 2 except for the electric current supplied by the finish feeder cable 11. Therefore, it becomes possible to conduct working of smoother surface roughness.

However, the structure shown in FIG. 8(b) has the following disadvantages. In the structure shown in FIG. 8(b), the insulating member 1 is attached to a lower portion of the surface plate table 8. However, when the working tank 14 and the surface plane table 8 are arranged close to each other and an area in which the working tank 14 and the surface plane table 8 are opposed to each other is large, the working tank 14 and the surface plane table 8 compose a type of condenser. Therefore, when AC voltage is impressed between the working tank 14 and the surface plane table 8, an electric current flows between them although they are electrically insulated from each other. As a result, an intensity of electric power required for working is increased, and it becomes impossible to obtain a predetermined surface roughness on the work surface. In the case where a larger insulating member is used so that a distance between the working tank 14 and the surface plane table 8 can not be too short, the material cost and the manufacturing cost of the insulating member made of expensive material such as ceramics are increased.

In order to meet the demand of high accuracy and short time for delivery which is requested by the present market in which parts worked by the electric discharge machine are traded, it is necessary that high working accuracy and high working speed are compatible with each other.

The conventional methods shown in FIGS. 8(a) and 8(b) for obtaining smoother surface roughness have the following disadvantages. Although the surface roughness on a work face becomes smoother, since the insulating member 1 is used in these method, electric power is supplied by the feeder cable and the finish feeder cable. Accordingly, by the influence of inductance of the feeder cable and the finish feeder cable, the discharge peak current is decreased, especially, the working speed in the case of rough working process is decreased. Therefore, it is impossible that the working accuracy and the working speed are compatible with each other although it is strongly requested by the market in which parts manufactured by the electric discharge machines are traded.

SUMMARY OF THE INVENTION

The present invention has been accomplished to solve the above conventional problems. It is an object of the present invention to provide a method of electric discharge machining and device thereof in which an enhancement in the working accuracy and an increase in the working speed can be made compatible with each other and further the manufacturing cost of parts manufactured by the electric discharge machine can be reduced.

The first invention provides a method of electric discharge machining characterized in that: when the surface roughness on a work face of the workpiece is more than a predetermined value, a bladder capable of expanding or contracting by the pressure of fluid filled in the bladder is contracted, and the work fluid is filled in a space between the working tank and the surface plate table and working is conducted on the workpiece; and when the surface roughness on a work face of the workpiece is not more than a predetermined value, the bladder is expanded, and a quantity of work fluid in the space between the work tank and the surface plate table is reduced and working is conducted on the workpiece.

The second invention provides a method of electric discharge machining according to the first invention, characterized in that: when the surface roughness on a work face of the workpiece is more than a predetermined value, working is conducted while electric power supply is increased by an electric power supply controlling means for controlling work electric power; and when the surface roughness on a work face of the workpiece is not more than a predetermined value, working is conducted while electric power supply is decreased by the electric power supply controlling means.

The third invention provides a method of electric discharge machining characterized in that: when the surface roughness on a work face of the workpiece is more than a predetermined value, working is conducted while substance having a high dielectric constant is filled in a shielding space formed between the surface plate table and the work tank with respect to the work fluid in the work tank; and when the surface roughness on a work face of the workpiece is not more than a predetermined value, working is conducted while substance having a low dielectric constant is filled in the shielding space.

The fourth invention provides a method of electric discharge machining according to the third invention, characterized in that: when the surface roughness on a work face of the workpiece is more than a predetermined value, working is conducted while electric power supply is increased by an electric power supply controlling means for controlling work electric power; and when the surface roughness on a work face of the workpiece is not more than a predetermined value, working is conducted while electric power supply is decreased by the electric power supply controlling means.

The fifth invention provides an electric discharge machine comprising: an insulating member arranged between the surface plate table and the work tank, connecting the surface plate table with the work tank, supporting the surface plane table; a bladder arranged between the surface plate table and the work tank, expanded and contracted by the pressure in the bladder; and an expanding and contracting device capable of expanding and contracting the bladder by changing the pressure in the bladder, and when the surface roughness on a work face of the workpiece is more than a predetermined value, a bladder capable of expanding or contracting by the pressure of fluid filled in the bladder is contracted, and the work fluid is filled in a space between the working tank and the surface plate table and working is conducted on the workpiece; and when the surface roughness on a work face of the workpiece is not more than a predetermined value, the bladder is expanded, and a quantity of work fluid in the space between the work tank and the surface plate table is reduced and working is conducted on the workpiece.

The sixth invention provides an electric discharge machine according to the fifth invention, further comprising an electric power supply controlling means for controlling work electric power, electric power supply is increased by the electric power supply controlling means when the surface roughness of a work face of the workpiece is more than a predetermined value, and electric power supply is decreased by the electric power supply controlling means when the surface roughness of a work face of the workpiece is not more than a predetermined value.

The seventh invention provides an electric discharge machine comprising: an insulating member arranged between the surface plate table and the work tank, connecting the surface plate table with the work tank, supporting the surface plane table; a shielding space formed between the surface plane table and the work tank, with respect to the work fluid in the work tank; and a fluid supplying and recovering device having a function supplying substance having a high dielectric constant to the shielding space and recovering substance having a high dielectric constant from the shielding space, and when the surface roughness on a work face of the workpiece is more than a predetermined value, working is conducted while substance having a high dielectric constant is filled in the shielding space by the fluid supplying and recovering device, and when the surface roughness on a work face of the workpiece is not more than a predetermined value, working is conducted while substance having a low dielectric constant is filled in the shielding space by the fluid supplying and recovering device.

The eighth invention provides an electric discharge machine according to the seventh, further comprising an electric power supply controlling means for controlling work electric power, electric power supply is increased by the electric power supply controlling means when the surface roughness of a work face of the workpiece is more than a predetermined value, and electric power supply is decreased by the electric power supply controlling means when the surface roughness of a work face of the workpiece is not more than a predetermined value.

Since the present invention is composed as described above, the following effects can be provided.

According to the method of electric discharge machining of the first and the third invention, when the surface roughness of a work face of the workpiece is more than a predetermined value, it is possible to replenish an intensity of electric power supply to the workpiece. Therefore, it becomes possible to prevent the working speed from decreasing. When the surface roughness of a work face of the workpiece is not more than a predetermined value, insulation of the surface plane table can be ensured. Therefore, it is possible to obtain a smoother work surface. Accordingly, an enhancement of the work accuracy and an increase in the work speed can be made compatible with each other. Further, it is possible to reduce a size of the insulating member to be used. Therefore, it becomes unnecessary to use expensive materials for the insulating member, and the manufacturing cost can be greatly reduced.

The methods of electric discharge machining according to the second and the fourth invention can provide the same effects as those of the first and the third invention, and electric power supply is changed over according to the surface roughness of a predetermined value of a work face of the workpiece. Therefore, the work accuracy and the work speed can be further enhanced.

The electric discharge machines according to the fifth and the seventh invention can provide the same effects as those of the first and the third invention.

The electric discharge machines according to the sixth and the eighth invention can provide the same effects as those of the second and the fourth invention.

BRIEF DESCRIPTION OF THE DRAWINGS

FIG. 3 is a view showing a working state of a feeder cable, finish feeder cable and bladder of Embodiment 1 of the present invention.

FIG. 6 is a view showing a state of working of a feeder cable, finish feeder cable and space A of Embodiment 2 of the present invention.

DETAILED DESCRIPTION OF THE PREFERRED EMBODIMENTS (Embodiment 1)

Figure 1:
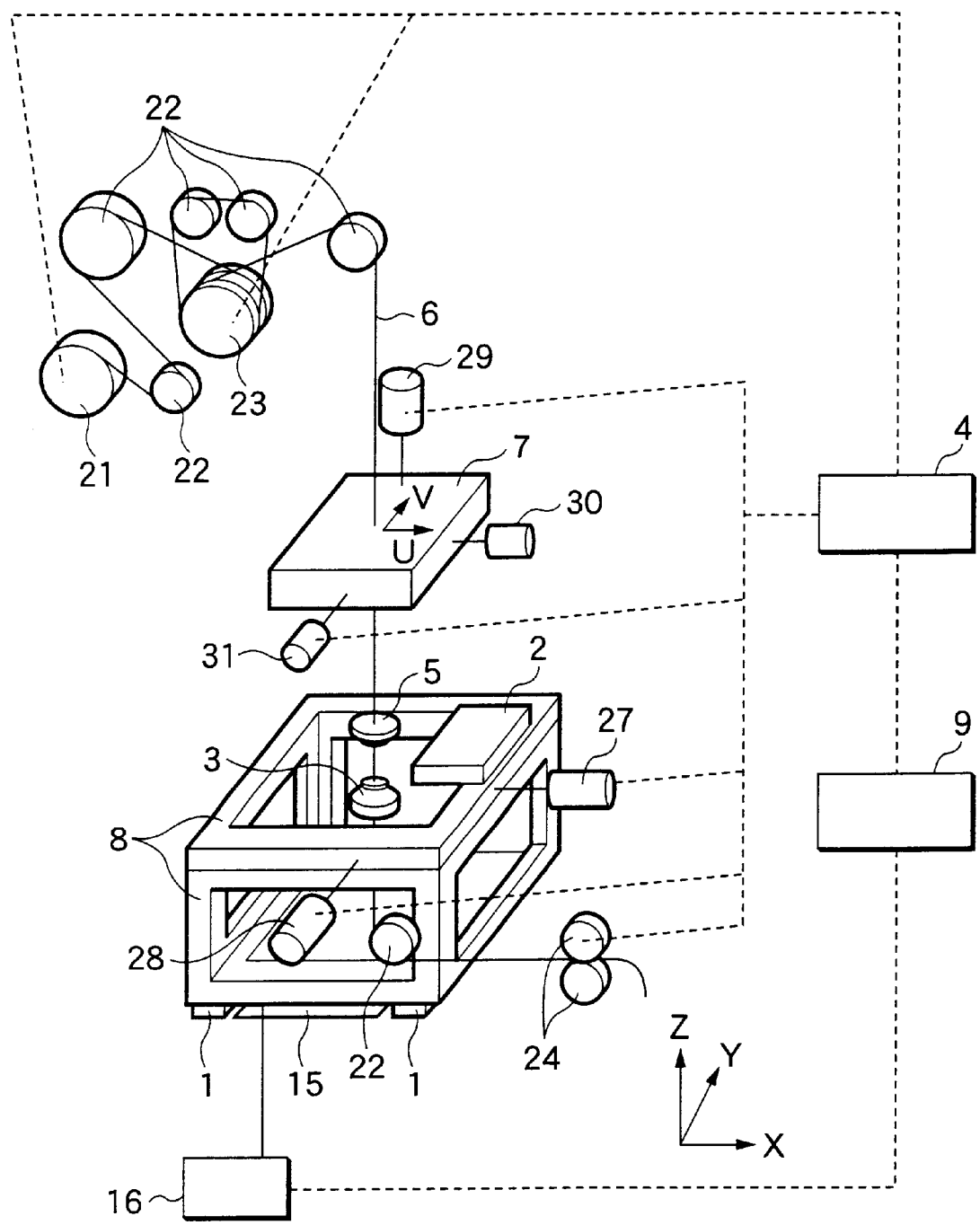
FIG. 1 is an overall arrangement view showing an electric discharge machine of Embodiment 1 of the present invention.
Figure 2A:
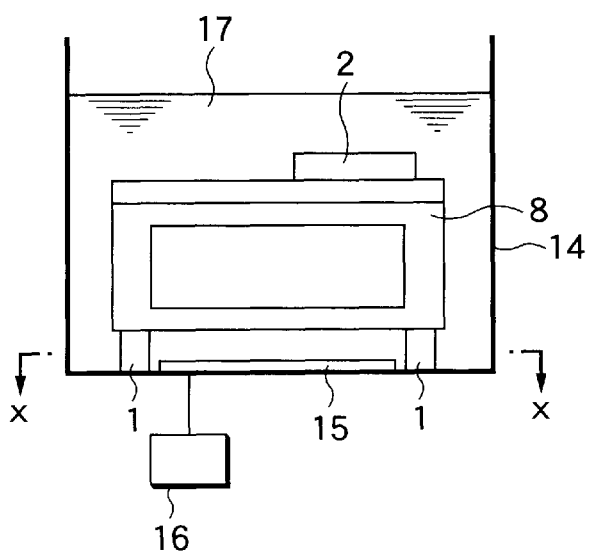
FIGS. 2(a), 2(b), and 2(c) show an arrangement view of table of Embodiment 1 of the present invention.
Figure 2B:
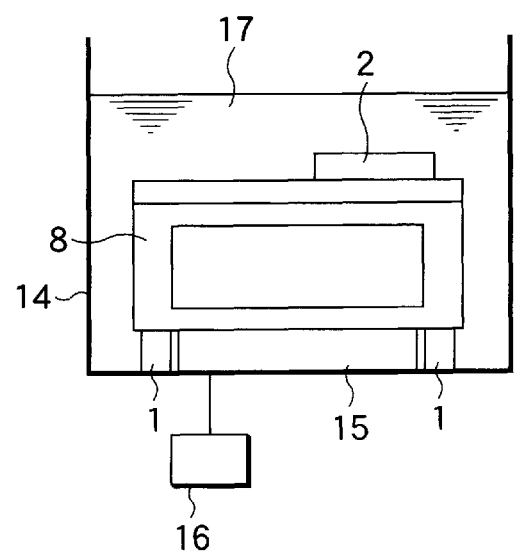
Figure 2C:
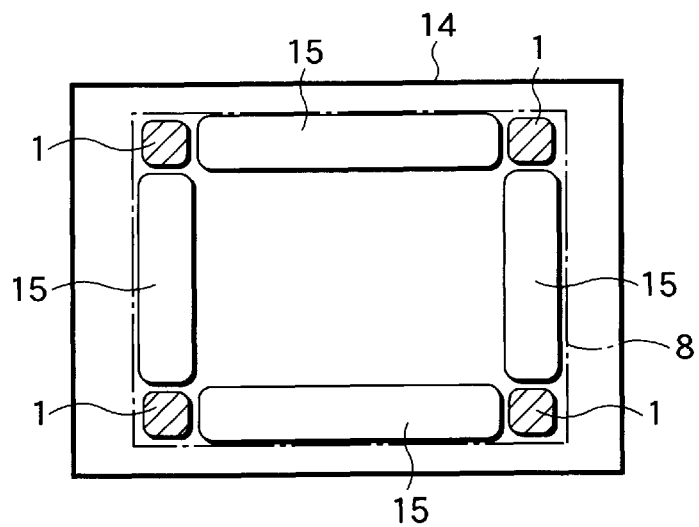
Figure 7:
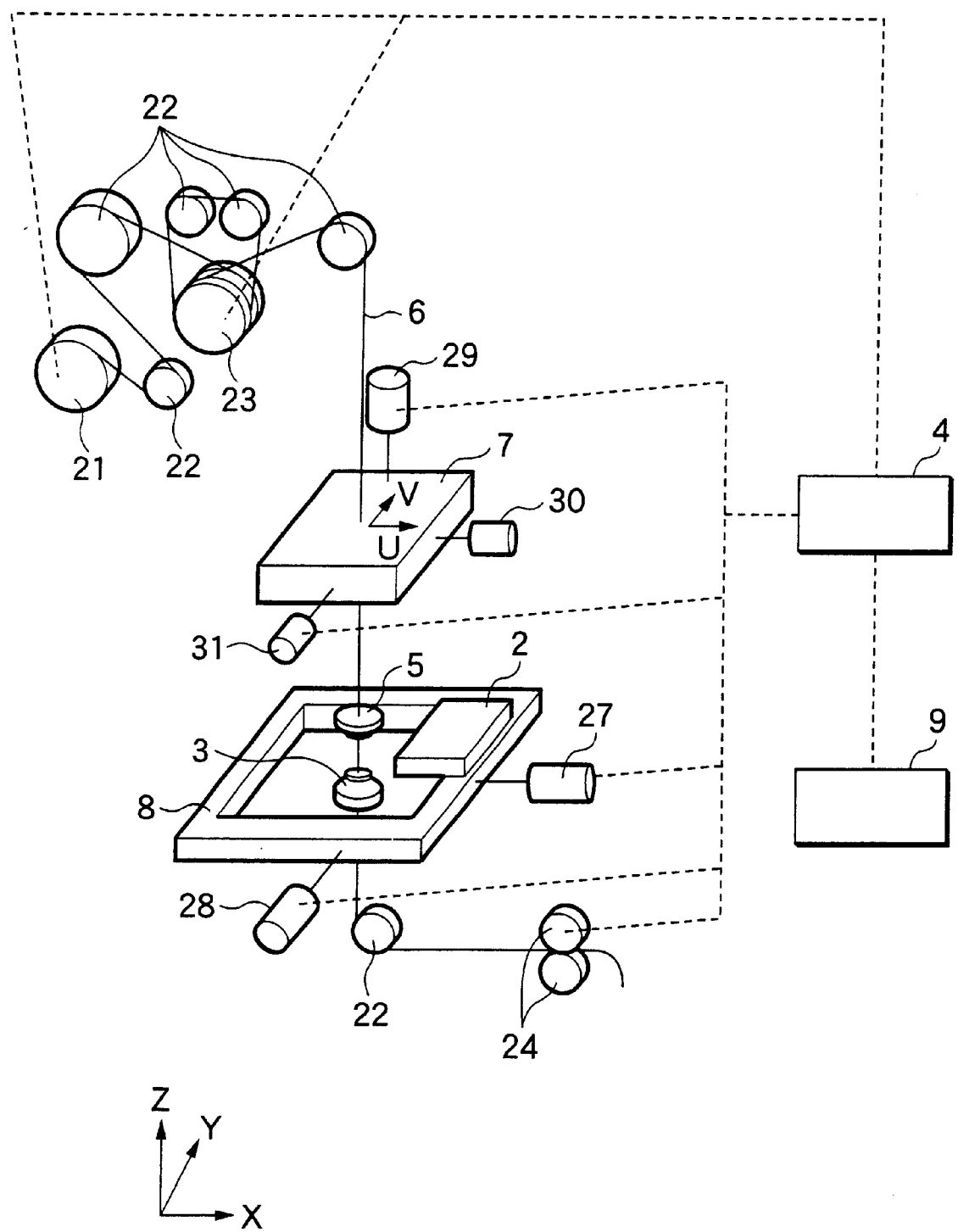
FIG. 7 is an overall arrangement view showing a conventional electric discharge machine.
Figure 8A:
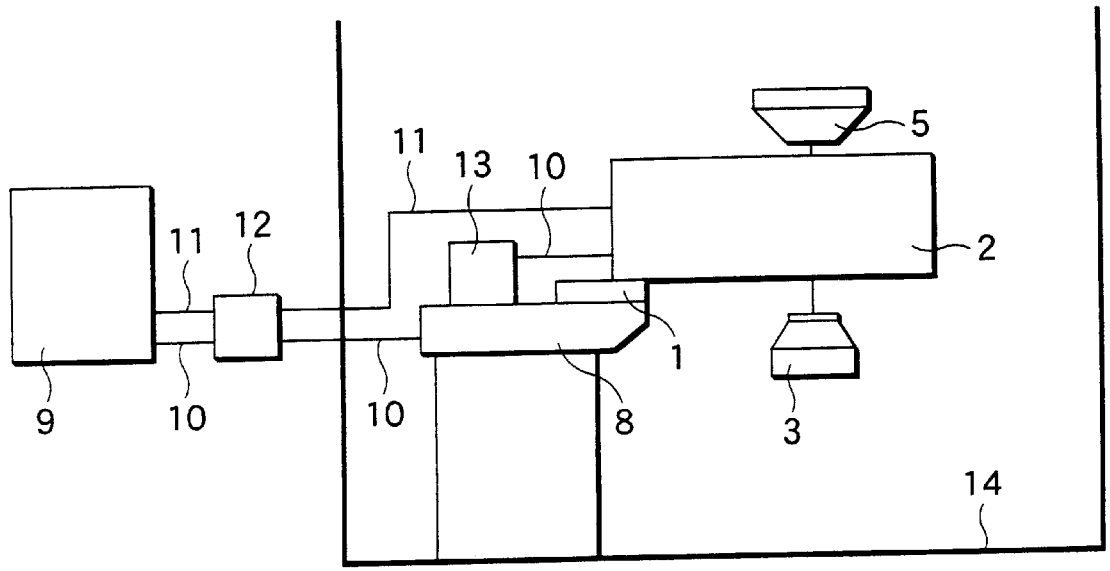
FIGS. 8(a) and 8(b) show an arrangement view of a surface plate table of the conventional electric discharge machine.
Figure 8B:
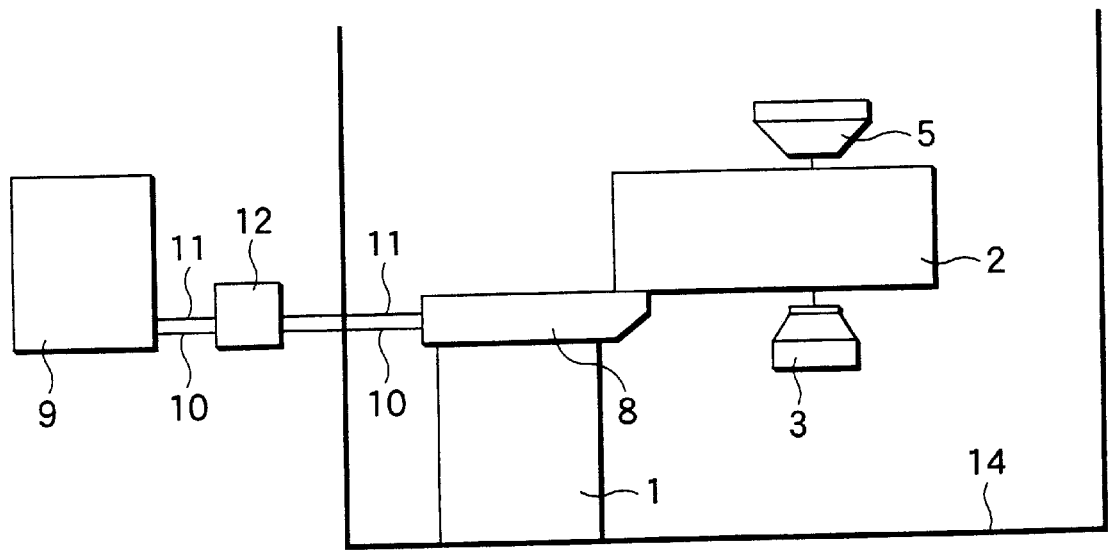

FIGS. 1,2(a), and 2(b) are views showing an electric discharge machine of Embodiment 1 of the present invention. In this case, a wire electric discharge machine is taken as an example. FIG. 1 is a view showing an overall arrangement, and, FIGS. 2(a), 2(b), and 2(c) show a view of an arrangement of a surface plane table. Like reference characters are used to indicate like parts in FIGS. 1 and 2(a), 2(b), and 2(c), showing Embodiment 1 and FIGS. 7 and 8(a) and 8(b) showing the related art.

In FIG. 1, reference numeral 15 is a bladder expanding and contracting by the pressure in the bladder, and reference numeral 16 is an expanding and contracting device capable of expanding and contracting the bladder 15, for example, the expanding and contracting device 16 expands and contracts the bladder 15 by changing the pressure in the bladder 15 when energy is transmitted by fluid that is sent from a pump. In FIGS. 2(a), 2(b), and 2(c), reference numeral 17 is a work fluid, and the workpiece 2 and others are dipped in the work fluid 17 in the work tank 14.

In this embodiment, the method of supplying electric power is the same as that of the electric discharge machine described in the related art. In the following explanations, a case in which electric power supply is changed when the surface roughness of a work face is 3 μmRmax will be taken as an example.

FIG. 2(a) is a view showing an arrangement of the surface plate table in the case of work conducted when the surface roughness of a work face is more than 3 μmRmax. FIG. 2(b) is a view showing an arrangement of the surface plate table in the case of work conducted when the surface roughness of a work face is not more than 3 μmRmax. FIG. 2(c) is a view showing a cross section taken on line X—X in FIG. 2(a). The bladder 15 is arranged between the surface plane table and the work tank and expanded and contracted by the expanding and contracting device 16.

In the case of work in which the surface roughness of a work face is more than 3 μmRmax, the bladder 15 is contracted by the expanding and contracting device 16 as shown in FIG. 2(a), so that the work fluid 17 is filled between the work tank 14 and the surface plane table 8. Due to the foregoing, a type of condenser is formed between the work tank 14 and the surface plane table 8. When an electric charge accumulated in the condenser flows out by AC power as an electric current, electric power is replenished to the workpiece 2, so that the working speed can be prevented from decreasing.

In the case of work in which the surface roughness of a work face is not more than 3 μmRmax, the bladder 15 is expanded by the expanding and contracting device 16 as shown in FIG. 2(b), so that the work fluid 17 can not enter a space formed between the work tank 14 and the surface plate table 8. In this case, substance such as air, the dielectric constant of which is low, is charged into the bladder 15. As long as the dielectric constant is low, either gas or liquid may be charged into the bladder 15. When the bladder 15 is expanded, it is possible to prevent the formation of a type of condenser between the work tank 14 and the surface plate table 8, and insulation of the surface plane table 8 can be ensured, and a smoother work face can be obtained.

Concerning the profile of the bladder 15, various profiles such as a bellows-shape, pillow-shape and tube-shape may be adopted. As long as the inside of the bladder can be filled with fluid and the bladder can be expanded and contracted in accordance with a change in pressure inside the bladder 15 by the expanding and contracting device 16, any profile of the bladder can be adopted.

Next, an arrangement of the insulating member 1 and the bladder 15 will be explained below. FIG. 2(c) is a view showing an example in which the surface plane table 8 is rectangular. Insulating members 1 are arranged at the four corners of the surface plane table 8, and the surface plane table 8 and the work tank 14 are fixed to each other via the insulating members 1. The bladders 15 are arranged among the four insulating members 1 in such a manner that no gaps are left among the bladders 15 and the insulating members 1. In the arrangement shown in FIGS. 2(a), 2(b), and 2(c), the bladders 15 are arranged only on the bottom face of the surface plane table 8, however, it is possible to arrange the bladders 15 on the sides of the surface plane table 8. The insulating member 1 may be directly connected with the surface plane table 8 and the work tank 14. Alternatively, the insulating member 1 may be connected with the surface plane table 8 and the work tank 14 via spacers.

FIG. 3 is a view showing a working state of a feeder cable, finish feeder cable and bladder of Embodiment 1 of the present invention in the case of work in which the surface roughness of a work face is more than 3 μmRmax and also in the case of work in which the surface roughness of a work face is not more than 3 μmRmax. A command of changing over the state is given by NC device 4 when a command of changing over the electric condition is given to the work electric power source 9 by NC device. Commands of driving X-axis servo motor 27, Y-axis servo motor 28, Z-axis servo motor 29, U-axis servo motor 30 and V-axis servo motor 31 are given after the bladders 15 have been expanded or contracted.

Concerning the electric power supply controlling means for controlling electric power supply, it possible to adopt an arrangement in which a plurality of feeder cables are opened and closed by the contactors as described before. However, the present invention is not limited to the above specific embodiment. As long as electric power supply can be controlled, any arrangement may be adopted, for example, after electric power supply has been controlled in the work electric power source 9, electric power may be supplied via a feeder cable.

As explained before referring to FIG. 2(c), it is an object of the insulating members 1 to insulate the surface plane table 8. Further, it is an object of the insulating members 1 to fix the surface plate table 8. Accordingly, although four insulating members 14 are used in the example shown in FIG. 2(c), the number of the insulating members 14 is not limited to four, but the number of the insulating members 14 may be changed according to the size of the surface plate table 8 when necessary.

In this case, the thickness of the insulating member 1 may be determined so that the surface plate table 8 can be insulated and fixed. Further, the size of the insulating member 1 can be reduced. Therefore, it is possible to reduce a quantity of expensive material to be used. Accordingly, the manufacturing cost can be greatly reduced.

(Embodiment 2)

Figure 4A:
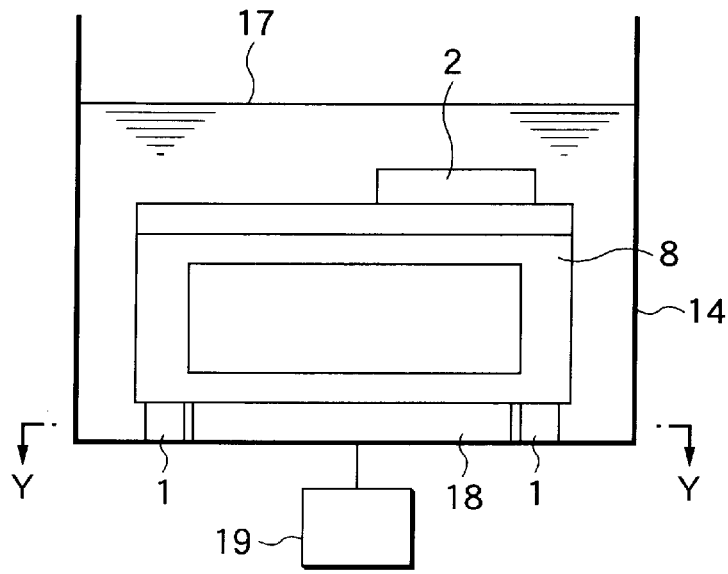
FIGS. 4(a) and 4(b) show an arrangement view plate table of an electric discharge machine of Embodiment 2 of the present invention.
Figure 4B:
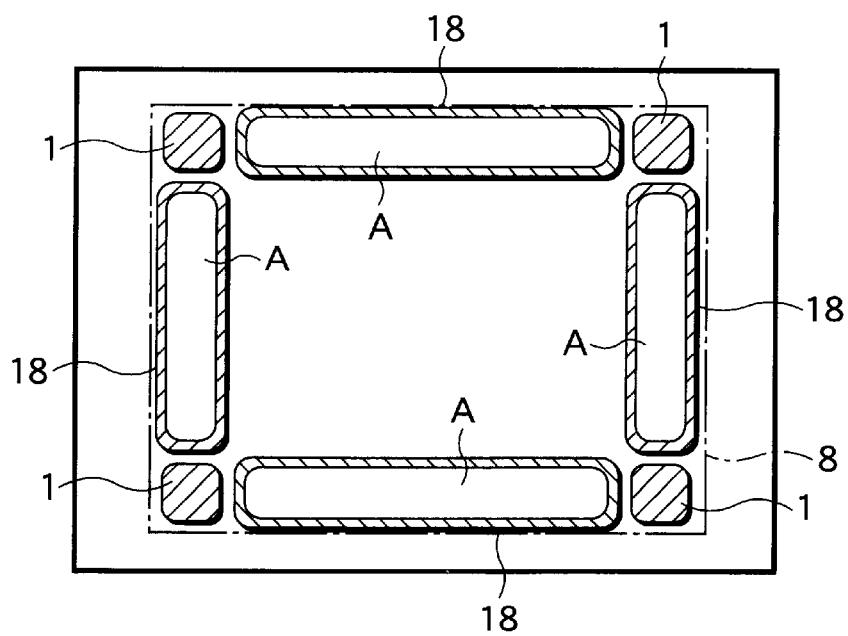

FIGS. 4(a) and 4(b) show an arrangement view of the surface plane table of the electric discharge machine of Embodiment 2 of the present invention. Like reference characters are used to indicate like parts in FIGS. 2(a), 2(b) and 2(c) showing Embodiment 1 and FIGS. 4(a) and 4(b) showing Embodiment 2. In FIG. 4(a), reference numeral 18 is a side wall capable of forming a shielding space for the work fluid 17 in the work tank 14 so that the work fluid 17 can not get into between the surface plate table 8 and the work tank 14. Reference numeral 19 is a fluid supplying and recovering device having a function of supplying substance such as a work fluid, the dielectric constant of which is high, into the shielding space (referred to as space A hereinafter) and recovering the substance from the shielding space, and also having a function of supplying and recovering substance such as air, the dielectric constant of which is low. FIG. 4(b) is a cross-sectional view taken on line Y—Y in FIG. 4(a). In FIG. 4(b), space A partitioned by the side wall 18 is shown.

Figure 5:
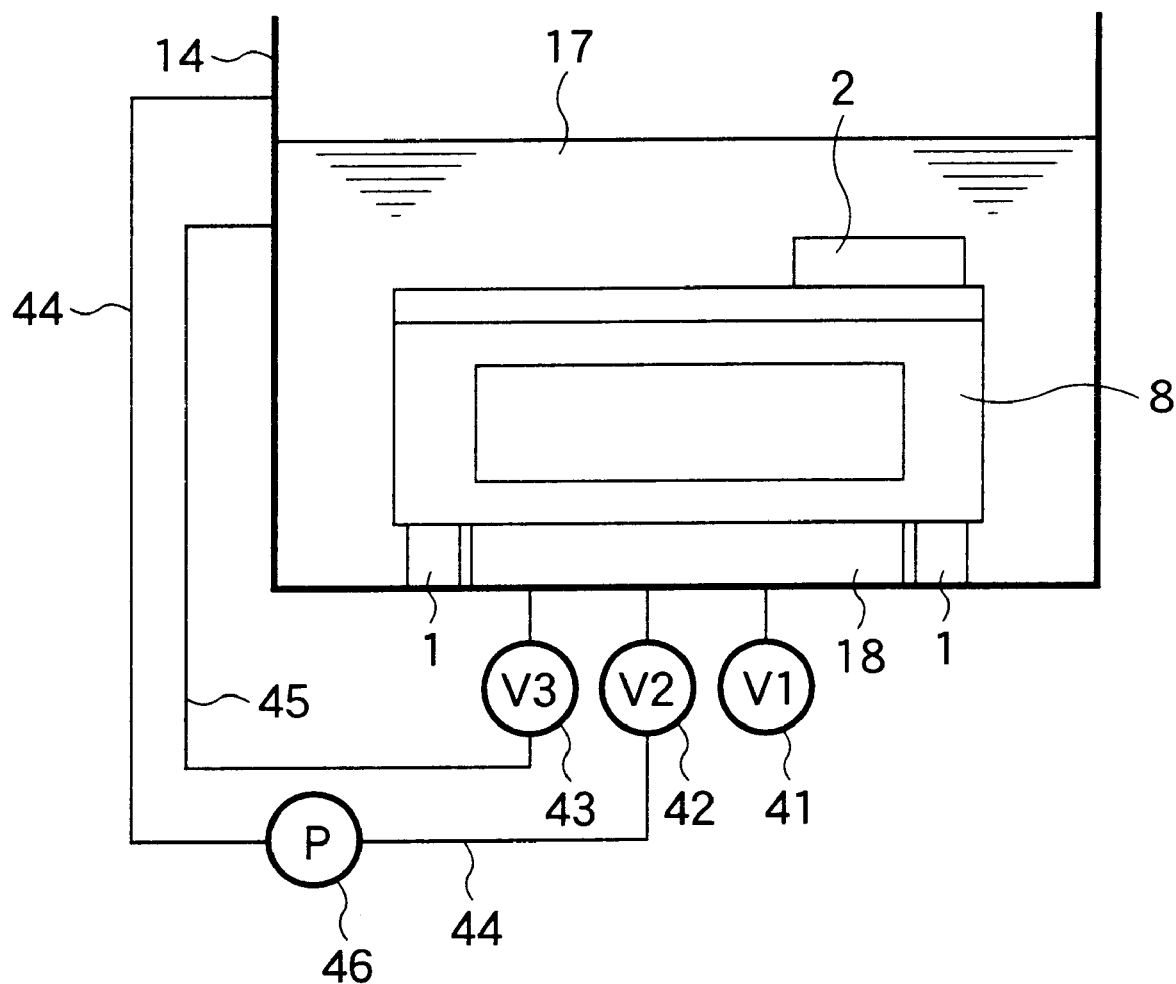
FIG. 5 is a view showing an example of a fluid supplying and recovering device of Embodiment 2 of the present invention.

An example of the arrangement of the fluid supplying and recovering device 19 is shown in FIG. 5. In this example, the work fluid 17 is used as the substance, the dielectric constant of which is high, and air is used as the substance, the dielectric constant of which is low. In the drawing, reference numerals 41, 42 and 43 are valves, reference numerals 44 and 45 are piping, and reference numeral 46 is a pump. The valve 41 opens and closes between space A and the atmosphere. Piping 45 connects space A with the work tank 14 via the valve 43. Piping 44 connects space A with the work tank 14 via the pump 46.

When the work fluid 17 is supplied to space A, the valve 41 is closed, the valve 42 is opened, and the valve 43 is opened. Then, the work fluid 17 is supplied from the piping 45 into space A by the pressure of the work fluid 17, and space A is filled with the work fluid 17, and the valve 42 is closed. Next, when the work fluid 17 is recovered and air is supplied to space A, first, the valve 43 is closed and the valve 42 is opened, and the work fluid 17 stored in space A is sucked from space A into the work tank 14 via the piping 44. In this case, when the valve 41 is opened, space A is filled with air. In this way, substance having a high dielectric constant can be supplied into space A, and also substance having a low dielectric constant can be supplied into space A.

In the case of work when the surface roughness of a work face is more than 3 μmRmax, space A is filled with substance such as work fluid, the dielectric constant of which is high, by the fluid supplying and recovering device 19. As long as the dielectric constant is high, either gas or liquid may be used as the substance to be filled into space A. Due to the foregoing, a type of condenser is composed between the work tank 14 and the surface plate table 8. When an electric charge accumulated in the condenser flows out as an electric current by AC power, electric power supply to be supplied to the workpiece 2 is replenished, so that the work speed of working the workpiece 2 can be prevented from decreasing.

In the case of working when the surface roughness of a work face is not more than 3 μmRmax, space A is filled with substance such as air, the dielectric constant of which is low, by the fluid supplying and recovering device 19. As long as the dielectric constant is low, either gas or liquid may be used as the substance to be filled into space A. Due to the foregoing, generation of a type of condenser is suppressed between the work tank 14 and the surface plate table 8, and the surface plate table 8 can be electrically insulated and a smoother work face can be provided.

Referring to FIG. 4(*b*), an arrangement of the insulating materials 1 and the side walls 18 are explained below. A case in which the surface plate table 8 is rectangular will be explained as an example. The insulating members 1 are arranged at four corners of the surface plate table 8, which is fixed to the work tank 14. Side walls 18 are arranged so that gaps among the four insulating members 1 can be filled by the side walls. In this explanation, the side walls are arranged only on the lower face of the surface plate table 8, however, the side walls may be arranged on the sides of the surface plate table 8.

FIG. 6 is a list showing a state of work of a feeder cable, finish feeder cable and space A in the case where the surface roughness of a work face is more than 3 μmRmax and also in the case where the surface roughness of a work face is not more than 3 μmRmax. A command to changeover the state is given in the same manner as that of Embodiment 1.

In the same manner as that of Embodiment 1, in Embodiment 2 explained above, the thickness of the insulating member 1 may be determined so that the surface plate table 8 can be insulated and fixed. Further, the size of the insulating member 1 can be reduced. Therefore, it is possible to reduce a quantity of expensive material to be used. Accordingly, the manufacturing cost can be greatly reduced.

In the above explanations, the wire electric discharge machine is explained as an example. Of course, the present invention can be applied to other types of electric discharge machines such as a diesinking electric discharge machine and others.

As described above, according to the method of electric discharge machining and the device thereof of the present invention, high working accuracy and high working speed can be made compatible with each other, and further the manufacturing cost can be greatly reduced. Therefore, the method of electric discharge machining and the device thereof of the present invention are suitable for electric discharge work.

What is claimed is:

1. A method of electric discharge machining in which electric power for working is supplied between an electrode and a workpiece which is fixed onto a surface plate table arranged in a work tank in which work fluid is stored and the workpiece is worked by electric discharge, wherein when the surface roughness on a work face of the workpiece is more than a predetermined value, a bladder capable of expanding or contracting by the pressure of fluid filled in said bladder is contracted, and the work fluid is filled in a space between the working tank and the surface plate table and working is conducted on the workpiece; and when the surface roughness on a work face of the workpiece is not more than a predetermined value, said bladder is expanded, and a quantity of work fluid in the space between the work tank and the surface plate table is reduced and working is conducted on the workpiece.

2. The method of electric discharge machining according to claim 1, wherein when the surface roughness on a work face of the workpiece is more than a predetermined value, working is conducted while electric power supply is increased by an electric power supply controlling means for controlling work electric power; and when the surface roughness on a work face of the workpiece is not more than a predetermined value, working is conducted while electric power supply is decreased by said electric power supply controlling means.

3. A method of electric discharge machining in which electric power for working is supplied between an electrode and a workpiece which is fixed onto a surface plate table arranged in a work tank in which work fluid is stored and the workpiece is worked by electric discharge, wherein when the surface roughness on a work face of the workpiece is more than a predetermined value, working is conducted while substance having a high dielectric constant is filled in a shielding space formed between the surface plate table and said work tank with respect to the work fluid in said work tank; and when the surface roughness on a work face of the workpiece is not more than a predetermined value, working is conducted while substance having a low dielectric constant is filled in the shielding space.

4. The method of electric discharge machining according to claim 3, wherein when the surface roughness on a work face of the workpiece is more than a predetermined value, working is conducted while electric power supply is increased by an electric power supply controlling means for controlling work electric power; and when the surface roughness on a work face of the workpiece is not more than a predetermined value, working is conducted while electric power supply is decreased by said electric power supply controlling means.

5. An electric discharge machine in which electric power for working is supplied between an electrode and a workpiece which is fixed onto a surface plate table arranged in a work tank in which work fluid is stored and the workpiece is worked by electric discharge, said electric discharge machine comprising:

an insulating member arranged between the surface plate table and said work tank, connecting the surface plate table with said work tank, supporting the surface plane table;

a bladder arranged between the surface plate table and said work tank, expanded and contracted by the pressure in said bladder; and an expanding and contracting device capable of expanding and contracting said bladder by changing the pressure in said bladder.

6. The electric discharge machine according to claim 5, further comprising:

an electric power supply controlling means for controlling work electric power, wherein said electric power supply is increased by said electric power supply controlling means, when the surface roughness of a work face of the workpiece is more than a predetermined value, and said electric power supply is decreased by said electric power supply controlling means, when the surface roughness of a work face of the workpiece is not more than a predetermined value.

7. An electric discharge machine in which electric power for working is supplied between an electrode and a workpiece which is fixed onto a surface plate table arranged in a work tank in which work fluid is stored and the workpiece is worked by electric discharge, said electric discharge machine comprising:

an insulating member arranged between the surface plate table and said work tank, connecting the surface plate table with said work tank, supporting the surface plane table;

a shielding space formed between the surface plane table and said work tank, with respect to the work fluid in said work tank; and a fluid supplying and recovering device having a function supplying substance having a high dielectric constant to the shielding space and recovering substance having a high dielectric constant from the shielding space.

8. The electric discharge machine according to claim 7, further comprising:

an electric power supply controlling means for controlling work electric power, wherein said electric power supply is increased by said electric power supply controlling means, when the surface roughness of a work face of the workpiece is more than a predetermined value, and said electric power supply is decreased by said electric power supply controlling means, when the surface roughness of a work face of the workpiece is not more than a predetermined value.

* * * * *